United States Patent [19]
Brümmer et al.

[11] 3,879,792
[45] Apr. 29, 1975

[54] WINDSHIELD WIPER FOR AUTOMOTIVE VEHICLES

[75] Inventors: Dietmar Brümmer, Buehlertal; Hans Maier; Werner Schwedhelm, both of Buehl; Helmut Steegmüller, Affalterbach; Manfred Donauer, Varnhalt, all of Germany

[73] Assignee: Robert Bosch G.m.b.H., Stuttgart, Germany

[22] Filed: May 12, 1972

[21] Appl. No.: 252,674

[30] Foreign Application Priority Data
June 9, 1971    Germany............................ 2128678

[52] U.S. Cl. ............................................ 15/250.42
[51] Int. Cl. ............................ B60s 1/04; B60s 1/38
[58] Field of Search........ 15/250.32, 250.36, 250.42

[56] References Cited
UNITED STATES PATENTS
2,807,821   10/1957   Scinta .............................. 15/250.42
3,408,679   11/1968   Deutscher et al............ 15/250.42 X
3,585,672   6/1971    Habert.............................. 15/250.32
3,644,957   2/1972    Deibel et al. .................... 15/250.42

FOREIGN PATENTS OR APPLICATIONS
1,183,446   3/1970   United Kingdom.............. 15/250.32
1,089,210   11/1967  United Kingdom.............. 15/250.42

*Primary Examiner*—Peter Feldman
*Attorney, Agent, or Firm*—Michael S. Striker

[57] ABSTRACT

A carrying arm of U-shaped cross-section receives a portion of a pivot arm which is also of U-shaped cross-section but of smaller dimensions so as to fit with clearance into the carrying arm. A pivot connector pivotally connects the pivot arm with the carrying arm and has portions which project beyond the pivot arm into engagement with an inner surface of the carrying arm so as to maintain the two arms spaced from one another.

5 Claims, 4 Drawing Figures

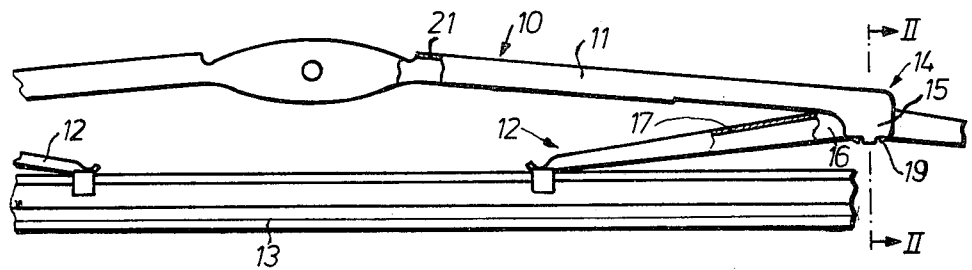
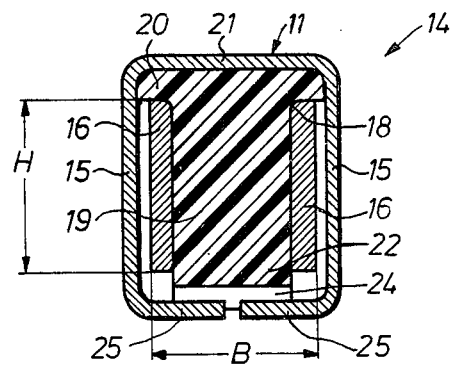
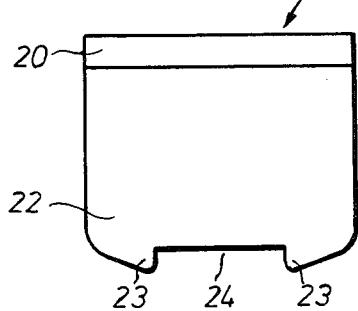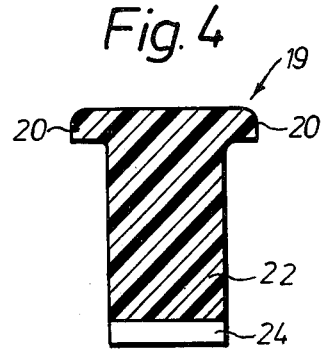

WINDSHIELD WIPER FOR AUTOMOTIVE VEHICLES

BACKGROUND OF THE INVENTION

The present invention relates generally to a windshield wiper for automotive vehicles, and more particularly to an improved windshield wiper in which operational noise is reduced over what is known from the prior art.

It is already known from the prior art to provide a windshield wiper for automotive vehicles wherein a carrying arm of U-shaped cross section has side walls and a transverse wall connecting the same. A pivot arm is in part received between these side walls, being connected with the carrying arm so that it moves with the same but is capable of performing pivoting motions relative to it. According to a prior-art construction there is located between the facing transverse walls of the pivot arm and the carrying arm a roller-shaped element of synthetic plastic material which is to prevent contact of these two surfaces the purpose being to avoid noise in the operation of the wiper. When the wiper blade carried wholly or in part by the pivot arm moves over a curved windshield it will follow the contour of the windshield in that the pivot arm pivots under the pressure exerted upon it by the wiper blade and the carrying arm respectively.

However, this prior art construction does not entirely achieve its intended purpose because the synthetic plastic roller does not extend beyond the side walls of the U-profiled pivot arm and is not guided with respect to the latter either, so that it is incapable of preventing the side walls of the pivot arm (to the extent that they are located within the side walls of the carrying arm) from contacting these side walls of the carrying arm and thus creating noise as a result of such an impact. Because of this this prior art construction will provide a metallic noise with each wiping motion it performs because with each such wiping motion there will be an impact between the side walls of the carrying arm and the side walls of the pivot arm. Moreover, the pivot arm is retained in the carrying arm by lugs provided on the side walls of the carrying arm and extending into recesses formed in the side walls of the pivot arm so that here also, metal-to-metal contact exists or can exist during relative movement with the result that this is another source of undesirable noise.

SUMMARY OF THE INVENTION

It is, accordingly an object of the present invention to provide an improved windshield wiper which is not possessed of the disadvantages of the prior art.

More particularly it is an object of the present invention to provide such an improved windshield wiper in which the production of noise due to contact between the carrying arm and the pivot arm is at least significantly reduced or entirely eliminated.

A still more particular object of the invention is to provide such an improved windshield wiper in which contact between the pivot arm and the carrying arm is avoided at least in the wiping operation of the wiper.

In pursuance of these objects and of others which will become apparent hereafter one feature of the invention resides in a windshield wiper for automotive vehicles which briefly stated, comprises a carrying arm having at least a portion of U-shaped cross-section and at least one pivot arm of smaller-dimensioned U-shaped cross-section and which is in part received with clearance in the aforementioned portion of the carrying arm. A pivot connector pivotally connects the pivot arm with the carrying arm and has projecting portions projecting beyond the cross-section of the pivot arm so as to maintain the latter out of contact with the carrying arm.

Thus, contact of the pivot arm with the carrying arm and vice versa, is reliably avoided so that the noise resulting from such contact is suppressed. Moreover, the pivot connector also provides for a guidance of the pivot arm with respect to the carrying arm in longitudinal direction of the latter and thereby of the wiper blade which is wholly or in part carried by the pivot arm.

The pivot connector itself is advantageously of substantially T-shaped cross-section and preferably, but not necessarily may be of synthetic plastic material. It can be connected in a very simply manner with the pivot arm by providing the transverse wall portion of the latter with an opening through which a portion of the shaft of the T-shaped pivot connector extends whereas the rest of the shaft is located between the side walls of the pivot arm and the transverse portion of the T-shaped connector is located between the transverse wall of the pivot arm and the transverse wall of the carrying arm, keeping these two walls out of contact. The opposite end portions of this transverse portion project beyond the side walls of the pivot arm so as to prevent contact of these side walls of the pivot arm with the side walls of the carrying arm. Thus, the pivot connector is reliably and in a simple manner retained in place, and at the same time provides for proper guidance of the pivot arm with respect to the carrying arm and for maintenance of the clearance between them.

The free end of the upright portion or shaft of the pivot connector, which faces the open side of the U-shaped cross-section of the pivot arm may be provided with a recess which in the direction of elongation of the pivot arm is delimited by projections of the pivot connector and into which recess lugs provided on the side walls of the carrying arm or of the pivot arm and bent inwardly of the respective U-shaped cross-section, may extend. In this manner, the pivot connector is reliably retained in place, cannot be accidentally lost by becoming disconnected from the carrying arm and in a very simple manner can act to guide the pivot arm with respect to the carrying arm in longitudinal direction of the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fragmentary somewhat diagrammatic side-elevational view of a wiper according to the present invention;

FIG. 2 is a section taken on line II—II of FIG. 1, on an enlarged scale;

FIG. 3 is a side view of the pivot connector utilized in FIG. 2; and

FIG. 4 is a cross-section of the pivot connector shown in FIG. 3.

DESCRIPTION OF THE PREFERRED EMBODIMENTS

Discussing the drawing in detail, wherein a single embodiment has been shown by way of example, it will be seen that reference numeral 10 designates the windshield wiper in toto. The wiper is of course shown only fragmentarily, that is to the extent that such showing is necessary for an understanding of the invention. The non-illustrated portions are of no importance for the present invention.

The wiper 10 includes an elongated carrying arm 11 which, as shown in FIG. 2, is of U-shaped cross-section and in conventional manner consists of metallic material, although the use of a different material is conceivable. The carrier arm 11 has connected with it in the usual manner two pivot arms 12, of which one is shown at the left-hand side of FIG. 1, in a fragmentary illustration, and another one is shown in a more detailed but also fragmentary illustration at the right-hand side of FIG. 1. These pivot arms 12 are also of U-shaped cross-section, again as shown in FIG. 2, and conventionally they also are of metallic material. The arms 12 together carry an elastomeric wiper blade 13 which may be of any of the various usual constructions and which is reinforced by strips of spring material, for instance spring steel, in direction transversely of its elongation. This, however, is of no importance for the invention and is conventional.

Each of the arms 12 is connected with the arm 11 via a joint 14, and the joint and in particular the features of the present invention will be described hereafter by way of example, with respect to the arm 12 shown at the right, it being understood that the same description also applies to the arm 12 where these features have not been illustrated.

It is clear from FIG. 1 that a portion of the pivot arm 12 extends in the region of the ends of the carrying arm 11 between the side walls 15 thereof which are connected by a transverse wall 21. The pivot arm 12 itself has side walls 16 connected by a transverse wall 17 which, in the illustrated embodiment, is provided with the opening or cutout 18 illustrated in FIG. 2. A pivot connector 19 is provided according to the present invention, being in the illustrated embodiment of synthetic plastic material (for instance nylon or the like) and having an essentially T-shaped cross-section. The connector 19 which is shown in a side elevational view in FIG. 3 and in a cross-section in FIG. 4, has a shaft portion 22 which is received between the side walls 16 of the arm 12 and which extends through the opening 18. The transverse portion or head 20 of the connector 19 abuts the upper edges of the side wall 16 and the upper or inner side of the wall 21, spacing the two from one another. In addition, the transverse width of the head 20 is so selected that the head will extend laterally beyond the outer side of the side walls 16 of the pivot arm 12; in other words, the transverse maximum dimension of the head 20 is greater than the outer dimension B of the U-shaped cross-section of the pivot arm 12. Thus, the juxtaposed side walls 15 and 16 are reliably maintained with a clearance between them as is evident from FIG. 2. The height or length of the shaft portion 22 is so selected that it exceeds the height H of the side walls 16 of the arm 12, so that the free end of the shaft portion 22 extends somewhat beyond the open side of the U-shaped cross-section of the pivot arm 12, as shown in FIG. 2.

This free end is provided, as is most clearly shown in FIGS. 3 and 4 with a recess 24 which is open at the sides and is delimited at opposite ends (the ends as seen with direction to the elongation of the arms 11 and 12), by projections 23. Into this recess 24 there extend from the lateral sides lugs 25 provided on the side walls 15 of the arm 11 and bent inwardly as shown in FIG. 2, so as to retain the pivot connector 19 and the arm 12 against separation of the arm 11. The lugs 15 of course constitute an important part of the joint 14, as will be appreciated.

It is clear from the description and from a consideration of the drawing and especially FIG. 2 that with the disclosed construction, the arm 12 is prevented from contacting any portions of the arms 11, certainly during the operation of the wiper 10, so that the undesirable generation of noise resulting from such contact in the prior art is avoided. At the same time, the pivot connector 19 of course serves as a guide, guiding the arm 12 with respect to longitudinal movement in the arm 11. It will be appreciated, however, that the present invention also embraces the concept of reversing the relationship in that the pivot connector 19 could be fixedly retained between the transverse wall 21 and the lugs 25 of the arm 11, with the opening 18 in the transverse wall 17 of the arm 12 being made larger so that the arm 12 could slide (within the limits dictated by the size of the opening) with reference to the arm 11 and the fixedly mounted pivot connector 19. This is within the concept and intent of the present invention.

It will be understood that each of the elements described above, or two or more together, may also find a useful application in other types of constructions differing from the types described above.

While the invention has been illustrated and described as embodied in a windshield wiper for automotive vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a windshield wiper for automotive vehicles, a combination comprising a carrying arm having at least a portion of U-shaped cross-section, said portion of said carrying arm having a pair of first side walls and a first transverse connecting wall; at least one pivot arm of smaller dimensioned U-shaped cross section having an open side and in part received with clearance in said portion of said carrying arm, said pivot arm having a pair of second side walls each inwardly spaced from one of said first side walls and a second transverse wall being inwardly spaced from said first transverse wall and having an opening; a pivot connector pivotally connecting said pivot arm with said carrying arm and being substantially T-shaped and having a shaft portion received between said second side walls and extending in part through said opening and having an end facing said open side of said pivot arm and provided with a recess, and a cross portion located intermediate said transverse walls in contact with said first transverse wall and extending between said first side walls, and comprising projecting portions projecting beyond the cross-section of said pivot arm by extending outwardly beyond said second side walls and said second transverse wall, so as to maintain said pivot arm out of contact with said carrying arm; and retaining lugs provided on the side walls of one of said pairs and extending into said recess of said pivot connector and engaging and retaining said pivot connector against displacement out of said arms.

2. In a windshield wiper for automotive vehicles, a combination comprising a carrying arm having at least a portion of U-shaped cross-section, said portion of said carrying arm having a pair of first side walls and a first transverse connecting wall; at least one pivot arm of smaller dimensioned U-shaped cross-section and in part received with clearance in said portion of said carrying arm, said pivot arm having a pair of second side walls each inwardly spaced from one of said first walls and a second transverse wall inwardly spaced from said transverse wall; a pivot connector pivotally connecting said pivot arm with said carrying arm and comprising projecting portions projecting beyond the cross-section of said pivot arm by extending outwardly beyond said second side walls and said second transverse wall, said pivot connector having a shaft portion received between said second side walls and having an end projecting beyond said second side walls, so as to maintain said pivot arm out of contact with said carrying arm; and retaining means provided on one of said arms for preventing separation of said arms and said pivot connector, said retaining means being maintained out of contact with the other of said arms by said projecting end.

3. In a windshield wiper for automotive vehicles, a combination comprising a carrying arm having at least a portion of U-shaped cross-section, said portion of said carrying arm having a pair of first side walls and a first transverse connecting wall; at least one pivot arm of smaller dimensioned U-shaped cross-section and in part received with clearance in said portion of said carrying arm, said pivot arm having a pair of second side walls each inwardly spaced from one of said first walls and a second transverse wall inwardly spaced from said first transverse wall; a pivot connector pivotally connecting said pivot arm with said carrying arm and comprising projecting portions projecting beyond the cross-section of said pivot arm by extending outwardly beyond said second side walls and said second transverse wall, so as to maintain said pivot arm out of contact with said carrying arm; and retaining means provided on edge portions of the side walls of one of said arms for preventing separation of said arms and said pivot connector, said retaining means being maintained out of contact with the other of said arms by said projecting portions.

4. In a windshield wiper as defined in claim 3, said arms being of metallic material, and said pivot connector being of non-metallic material.

5. In a windshield wiper as defined in claim 4, wherein said non-metallic material is a synthetic plastic material.

* * * * *